Patented Feb. 19, 1929.

1,703,065

UNITED STATES PATENT OFFICE.

EARL LEESON HAUMAN, OF HAMBURG, NEW YORK, ASSIGNOR TO THE EXOLON COMPANY, OF BLASDELL, NEW YORK, A CORPORATION OF MASSACHUSETTS.

SEPARATION OF REFRACTORY MATERIALS.

No Drawing. Application filed October 11, 1926. Serial No. 141,022.

The separation of certain materials, especially those of other than elementary composition, from mixtures or from impurities, has been variously practiced heretofore in the arts. My present invention relates to that class of separation which is generally known as gravity separation as it depends upon differences in specific gravity as a basis for the separation accomplished. This is an inexpensive and satisfactory process where there is a sufficient difference in specific gravities of the materials involved to give or permit the effective action of a concentration table or like apparatus.

In certain mixtures of materials there are, however, often found particles of matter to be separated that are so nearly the same specific gravity that ordinary methods of gravity separation are not effective to produce the desired degree of concentration.

While the problem varies considerably in different arts, the concept of my invention is readily applicable and may be readily understood from the explanation of one example. For that purpose, I have selected a reclamation of such a material as refractories which frequently occur in commerce either with casual impurities or with other matter combined with the refractory material in some previous process of manufacture, as for example, where a refractory material is to be reclaimed from a bonded refractory lining or like product.

In such a case the scrap material whether it be old refractory lining or retorts, while containing valuable refractory materials also contains bond used in their manufacture and usually also contain scale incident to the use of the article into which they have been previously manufactured.

The treatment of such material as to its bond is only indirectly involved in my present invention, although the presence of the bond is or may be a factor involved in the elimination of what is generally termed scale, by which is included a considerable variety of deposits resulting from fusion at high temperature of those materials which have been heated in the retort or furnace.

The separation of such scale from the refractory illustrates a characteristic form of my novel method. I therefore will illustrate a characteristic procedure which is as follows:

I take any refractory material either from the original scrap or from any source from which any refractory is left with such an impurity and crush to preferably a fineness of 6 mesh and finer. Up to this point I proceed along lines that have been generally recognized as convenient practice and as such the preliminary steps need no particular elaboration. Where certain refractories such as silicon carbide have been used under such conditions as in furnaces and retorts, the refractory material, especially as it appears later in scrap, will be found to have or to have acquired a certain amount of carbon which contributes perceptibly to the specific gravity of the material as a whole. Whether the carbon was present initially or was acquired under the conditions under which the material has been subjected, is immaterial. I have discovered that this ingredient may be eliminated, as for example by roasting the ground refractory material containing it so as to burn it out. In such materials as refractories the carbon may be due to decomposition of silicon carbide or may result from kiln treatment or may occur as graphite in the particles.

This step can be accomplished in any ordinary roasting furnace by heating to a bright red heat. The matter of temperature and time is one that can be readily ascertained by any one skilled in the art because if the resultant material was not sufficiently differentiated as to specific gravity, it would be obvious that the temperature should be raised or the time lengthened or in some cases both time and temperature might be increased.

When so treated the particles or grains of the refractory material will now be found to be sufficiently differentiated as to their specific gravities so as to be readily separable on a concentration table or by any well known method that may be convenient.

Up to this point I have referred to my invention first generally in its application to the arts and then somewhat more specifically in its application to the recovery of refractories. We may now consider a further development of the broader concept of the invention which also in its present commercial development is particularly related to the recovery of refractories, although it has its adaptations in other arts as will be apparent to those skilled therein.

In the recovery of refractories the effectiveness of any process is in part dependent upon the recovery of the refractory crystals in their existent sizes in the material to be reclaimed. While it is possible, of course, to reduce the crystalline material to a fineness in which there would be a uniformity of crystalline particles, such is not at all desirable, and in fact, the converse as above stated is a high desideratum.

It will be understood that where in such a material of whatever size the particle or grain, there are usually present crystals of various sizes which may range down to say as fine as 300 mesh. The actual particles of such a crushed material will consist of agglomerates of crystals of various sizes as well as some free crystals and are comparatively free from bond while the agglomerates of smaller crystals contain more of the bond.

To arrive at a desired assortment or selection of the grades of crystalline sizes of such material there is involved more than the ordinary basis of separation by specific gravity. It will be seen that it is necessary to recognize apparent specific gravity as distinguished from true specific gravity because we are dealing with many particles which are agglomerates of both crystal and bond. At this point the importance of the elimination of such elements as carbon becomes more apparent. The presence of the carbon in the bond tends to make the bond a more dense mass and the smaller the crystals and the more of the bond, the more important becomes the specific gravity of the carbon, because where the bond is present in larger proportion, the carbon is also present in larger proportion and the elimination of the carbon makes the greater difference in the apparent specific gravity.

Recognizing these factors we will now see that on a separation table there is a tendency of the crystals in the purer states, that is to say, with less bond, to separate from the crystals combined with the bond because the bond has been rendered more porous by the removal of the carbon and is of lower specific gravity. In practice I make the separation into three groups which grade down from the practically pure larger crystals down to the more impure bonded smaller crystals.

Up to this point we have considered only one separation. It will be now seen that the groups so separated are capable of different treatment. The substantially pure or unbonded crystals are now capable of separation for subsequent treatment from which I obtain large pure crystals of high quality. From the second group I get crystals which in themselves are valuable and recoverable but usually only by regrinding which, of course, involves a reduction in size. This reground agglomerate from the second group can then be retabled and separated again for purity and this process can be carried on as far as is commercially justified.

In the third group there will be segregated the impure agglomerates of crystals of smaller size. This third group is usually reduced still finer and may be retabled with profitable recovery, although obviously it justifies less of a continuance of the process of reclamation than the more valuable material of the first and second groups. The ultimate by-product as in the case of a bonded refractory may be used as a profitable contribution to refractory elements.

From the foregoing it will be seen how my original concept carries through in a specialized application such as is involved in the recovery of bonded refractories and how it is made to accomplish such a desired result as the reclamation of larger size crystals of substantially original dimensions and of considerable purity as well as the reclamation of other crystals only slightly reduced in size and of equal purity, without material loss of any of the crystalline content and without even waste of the resultant by-product. It may be stated that the crystals recovered as above are in themselves of a considerable degree of purity and are of grades and qualities heretofore considered as highly desirable, although as I have above stated I contemplate the subjection of even these crystals to my other treatments hereinbefore mentioned with the production of an ultimate quality which has not been heretofore attained.

While I have referred specifically to refractory scrap or retort of furnace lining origin, it will be understood that there may be and doubtless are a great variety of materials of this nature which heretofore have either not been reclaimed or have been only imperfectly reclaimed to which my invention will apply. It will also be understood that my invention is, as above suggested, capable of combination with a variety of supplemental methods of treatment for the production of a great variety of materials and that the steps of such process will be variously arranged. All such are to be understood as within the purview of my present invention as defined in the appended claims.

What I therefore claim and desire to secure by Letters Patent is:—

1. The method of classifying bonded particles having included carbon, according to their crystalline size, consisting in grading bonded refractory material by particle size, in driving off the included carbon and in subjecting to gravity separation.

2. The method of classifying carbon carrying particles of bonded refractory material of variant crystalline formation according to their ultimate crystalline size, consisting in driving off the carbon from the particles by bonded refractory material and in sorting the cleaned particles by gravity separation based on their relative porosities resultant from decarbonization.

3. The method of classifying particles of material of variant crystalline formation according to their ultimate crystalline size, said particles having included foreign matter, consisting in eliminating the foreign matter from the particles by bonded refractory material and in sorting the cleaned particles by gravity separation based on their relative resultant porosities.

4. In the art of classifying particles of bonded refractory materials of variant crystalline formation according to their ultimate crystalline size, said particles having included foreign matter, those steps which consist in roasting at high temperatures to eliminate the foreign matter from the particles of bonded refractory material, and in sorting the cleaned particles by gravity separation based on their relative resultant porosities.

In testimony whereof I affix my signature.

EARL LEESON HAUMAN.